April 28, 1953 G. E. REDFIELD 2,636,742

PHONOGRAPH RECORD CHANGER

Filed Sept. 26, 1947 8 Sheets-Sheet 1

INVENTOR.
GEORGE E. REDFIELD
BY
J. D. Douglas
His ATTORNEY

April 28, 1953 G. E. REDFIELD 2,636,742

PHONOGRAPH RECORD CHANGER

Filed Sept. 26, 1947 8 Sheets-Sheet 2

INVENTOR
GEORGE E. REDFIELD
BY
J. W. Douglass
His ATTORNEY

INVENTOR.
GEORGE E. REDFIELD
BY
J. U. Douglas
His ATTORNEY

INVENTOR.
GEORGE E. REDFIELD
BY
J. D. Douglas
His ATTORNEY

April 28, 1953 G. E. REDFIELD 2,636,742

PHONOGRAPH RECORD CHANGER

Filed Sept. 26, 1947 8 Sheets-Sheet 5

INVENTOR.
GEORGE E. REDFIELD
BY J. D. Douglas
His ATTORNEY

INVENTOR
GEORGE E. REDFIELD
BY
J. W. Douglas
His ATTORNEY

INVENTOR.
GEORGE E. REDFIELD
BY
J. D. Douglas
His ATTORNEY

INVENTOR.
GEORGE E. REDFIELD
BY J. W. Douglas
his ATTORNEY

Patented Apr. 28, 1953

2,636,742

UNITED STATES PATENT OFFICE 2,636,742

PHONOGRAPH RECORD CHANGER

George E. Redfield, Chicago, Ill., assignor to Admiral Corporation, Chicago, Ill., a corporation of Delaware Application September 26, 1947, Serial No. 776,264

18 Claims. (Cl. 274—10)

This invention relates to new and useful improvements in phonograph record player mechanisms and more particularly to a record changer of the type where the records are disposed in a stack above the turntable and discharged successively one at a time onto the turntable.

Among the improvements which are incorporated in the present invention are those which afford convenience of repair or adjustments of the same and which provide for economy of manufacture.

Other advantages of the invention will be set forth in part hereinafter and in part will be obvious herefrom, or may be learned by practice with the invention, the same being realized and attained by means of the instrumentalities and combinations pointed out in the appended claims.

The accompanying drawings, referred to herein and constituting a part hereof, illustrate one embodiment of the invention and together with the description, serve to explain the principles of the invention.

Figures 1, 13:
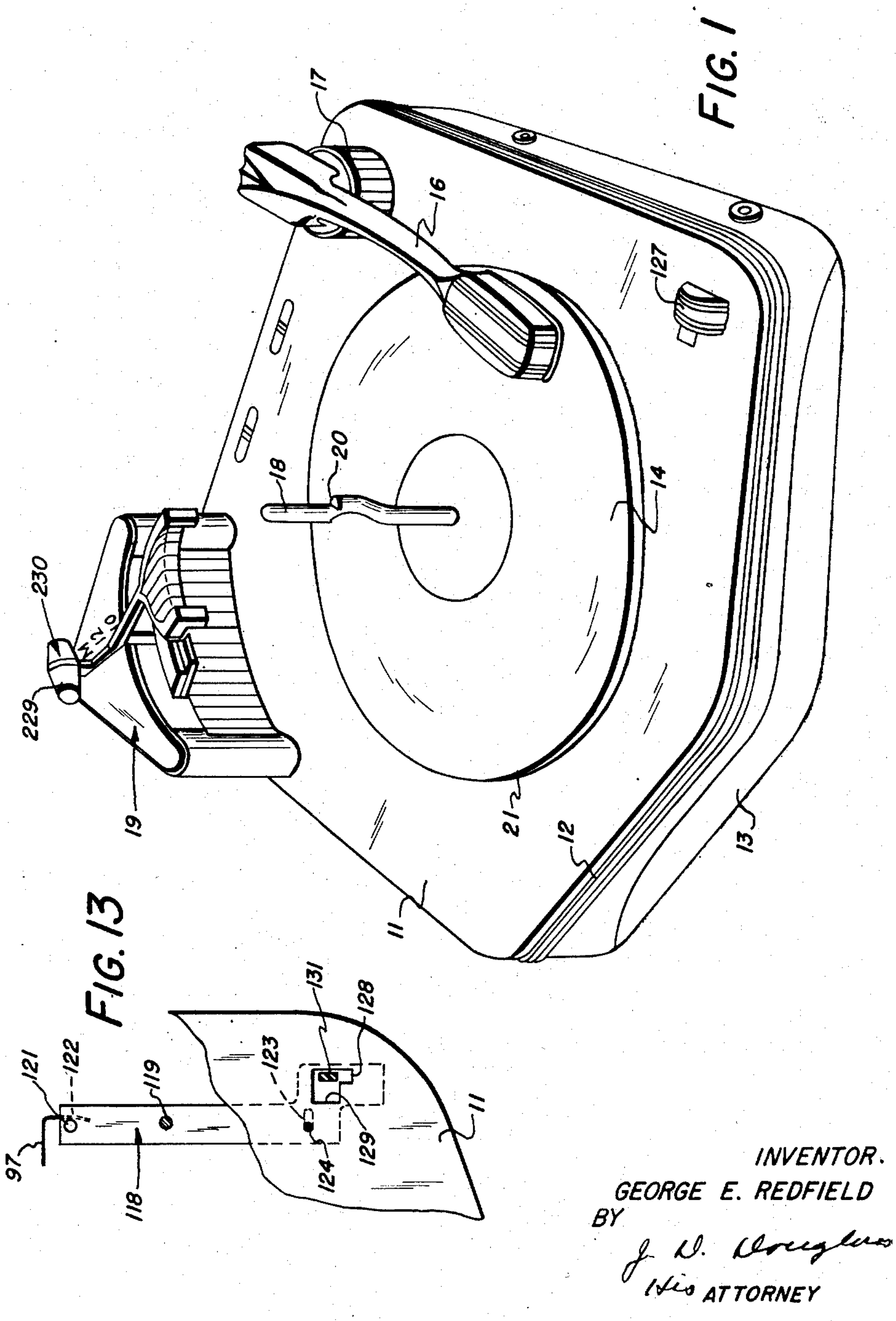
Fig. 1 is a perspective view of my improved record player.
Fig. 13 is a fragmentary top plan view of a corner of the chassis plate and the manual reject lever and the motor switch.

In connection with the improved record player, the reference character 11 is used throughout the drawings to denote a base or chassis plate; an edge 12 of the plate extends downwardly over the vertical sides of a bottom casing 13 that houses the other elements of the record player. A turntable 14 is provided for supporting disc type records to be played while they are engaged by a pickup or tone arm 16 supported from the chassis plate 11 by a pedestal 17. The records are supported at their center by a shouldered spindle 18 and at their edges by an ejector head 19. The ejector head dislodges the records one at a time from the shoulder 20 so that they may drop onto the turntable 14 where they are played.

Figure 2:
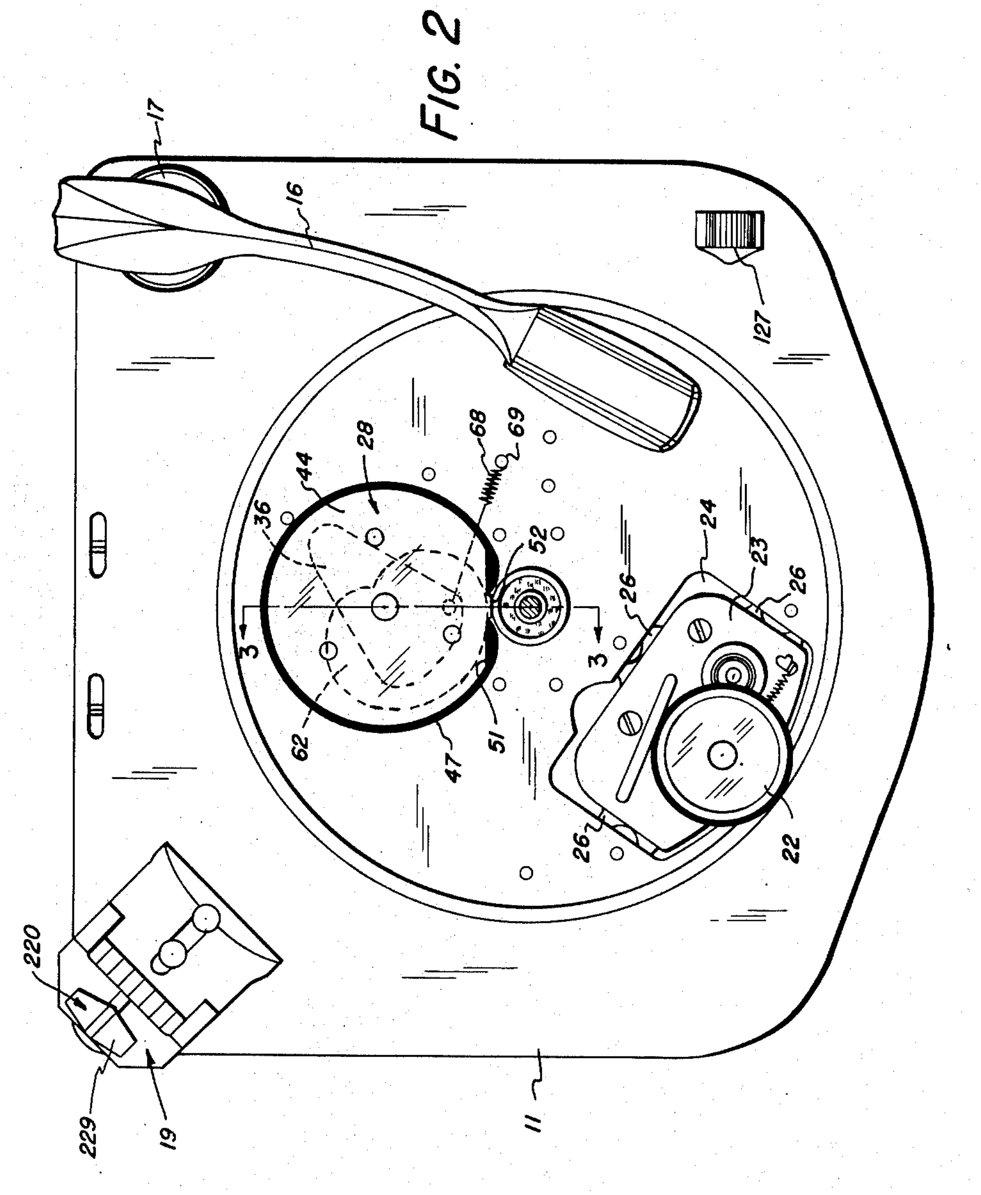
Fig. 2 is a top plan view of the record player shown in Fig. 1, the ejector head cap and turntable having been removed to reveal the structure of underlying parts.
Figure 15:
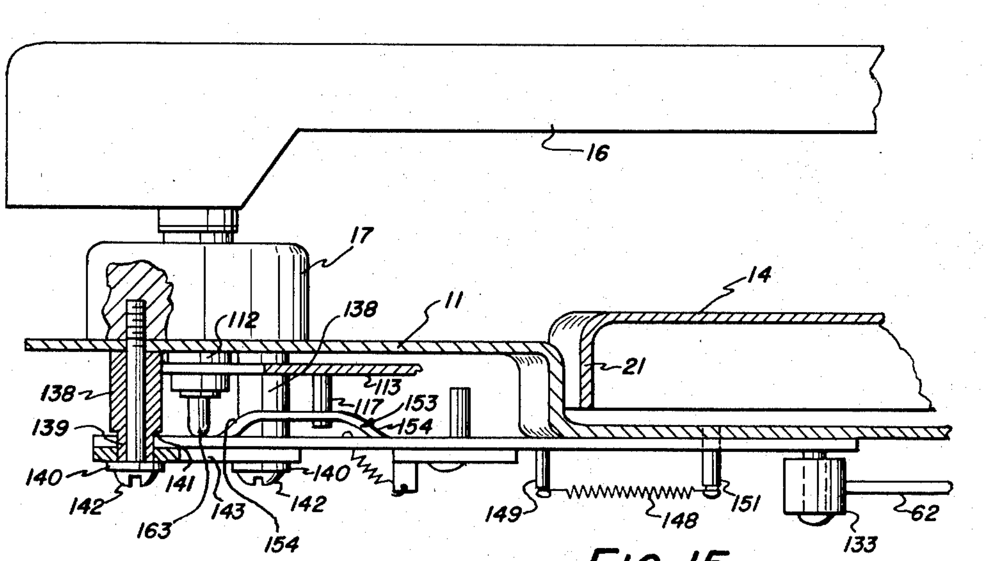
Fig. 15 is a section on line 15—15 of Fig. 8.

The played records accumulate on the turntable. The turntable has a peripheral skirt 21 (Figs. 2 and 15) that is resiliently engaged by a friction wheel 22 on a motor unit indicated in its entirety by the character 23. The motor unit is provided with legs 26 for resiliently supporting the same on the chassis plate opposite an opening 24.

Figure 3:
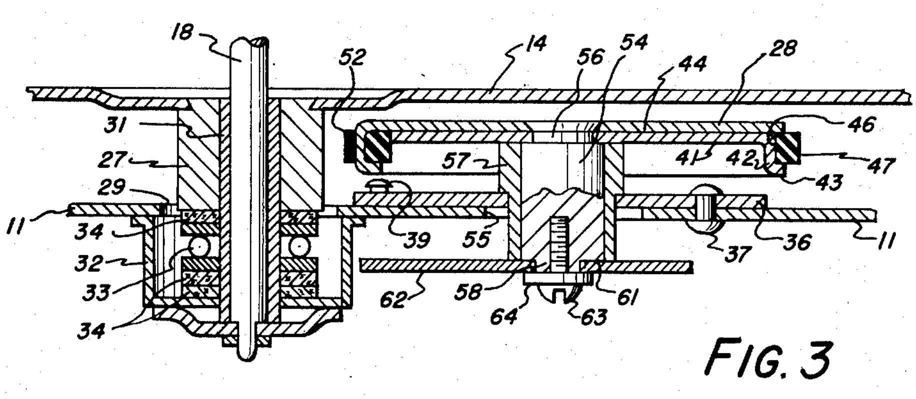
Fig. 3 is a sectional view showing the drive for the mechanism taken on line 3—3 of Fig. 2.
Figure 4:
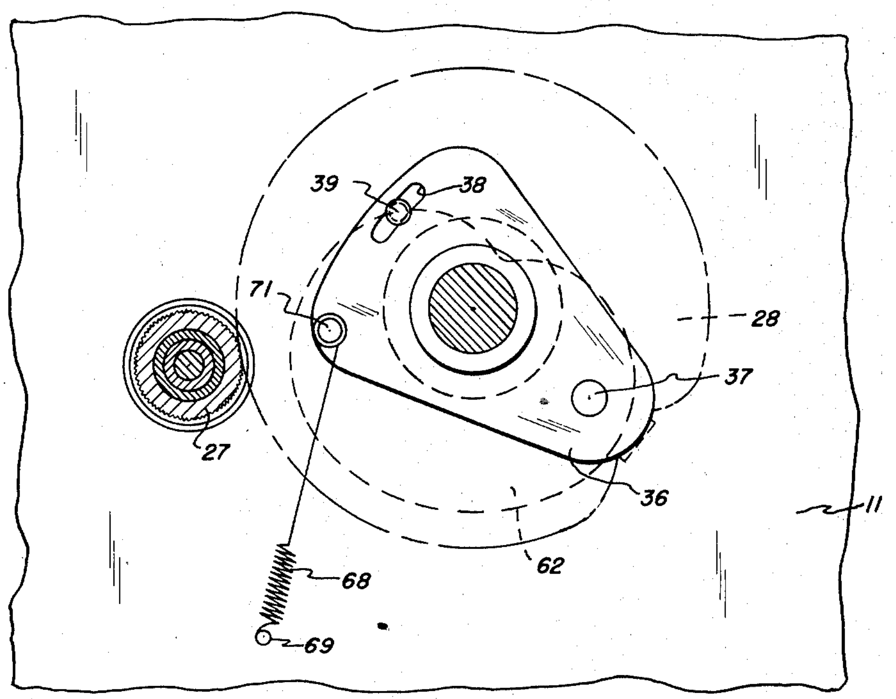
Fig. 4 is a top plan view of the mechanism adapted to support a friction wheel, the position of the wheel being shown in dashed lines.

Cyclically automatic mechanism is provided for manipulating the pickup arm 16, rejecting a record after it has been played and operating mechanism for supplying an unplayed record to the turntable on top of the record previously played. The drive for the mechanism comprises a knurled hub 27 on the turntable and a friction wheel 28 which is adapted to be engaged with the hub to effect the record changing cycle, either automatically or manually. Extending vertically through an aperture 29 in the plate 11, Fig. 3, the hub is rotatably carried on a tubular fixed pintle or sleeve 31 which is rigidly connected to the chassis plate 11 by a bracket 32. The hub is supported against downward displacement by a thrust bearing 33 and vibration dampening washers 34, of some suitable material such as cork, resting on the bracket 32. The friction wheel 28 is carried by a plate 36 (Fig. 4) pivoted to the chassis plate 11 by the pin 37. Circumferentially of the pin 37, the plate 36 includes a slot 38 in which is received a headed pin 39 carried by the base 11 to limit the rotation of plate 36 about the pin 37.

The friction wheel 28 is adapted to be driven from the hub 27 and may be in any form. A preferred form comprises a lower disc 41 (Figs. 3 and 4) which has, extending laterally for the most part of its periphery, a skirt 42 from which a circumferential flange 43 extends surrounding the greater part of the disc. An upper disc 44, rigidly attached to the disc 41 in some suitable manner such as by spot welding, has a diameter substantially equal to the diameter of the flanged portion 43 of the disc 41. A groove 46 at the edges of the discs is thus provided which is adapted to receive a resilient, endless tire 47 of some suitable material such as rubber. Uniformity of the peripheral region of the disc 41 is broken by a notch 48 which includes spaced apart parallel edges 49. Above the notch 48 the periphery of the disc 44 is broken by a cut-away straight portion 51 (Fig. 2) from which a finger 52 extends. The finger 52 is bent downwardly and backwardly thus providing a hook behind which the tire 47 extends so that a notch 53 is defined by the inwardly extending tire 47. Consequently, when driving engagement of the wheel 28 and hub 27 is established, the wheel 28 is adapted to rotate only until the notch 53 is adjacent the hub 27 at which time the hub is in spaced relationship to the wheel 28.

Figure 6:
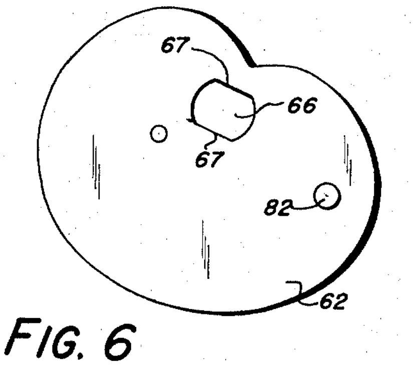
Fig. 6 is a bottom plan view of a cam used with the friction wheel.
Figure 5:
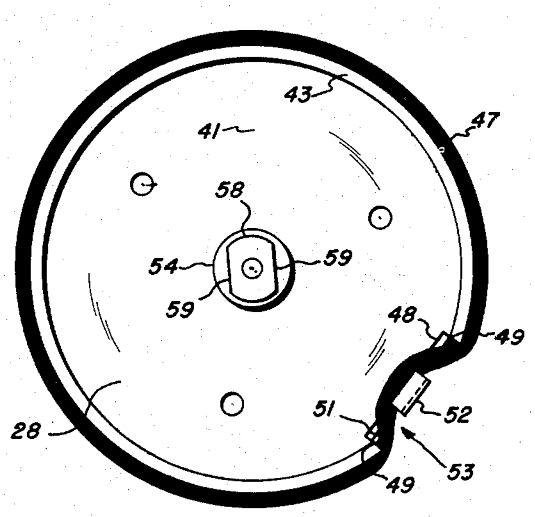
Fig. 5 is a bottom plan view of the friction wheel and its stub shaft.
Figure 7:
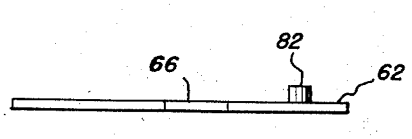
Fig. 7 is an elevational view of the cam shown in Fig. 6.

In order that the wheel 28 may be supported so that it is adapted to be drivingly associated with the hub 27, a stub shaft 54 is employed. An end portion 56 of the shaft 54 is of reduced diameter, so that the stub shaft may be rigidly attached to the discs 41 and 44 in some suitable manner. The plate 36, on the other hand, carries a vertical bearing 57 in which the shaft 54 is journaled. Provision for lateral motion of the bearing 57 includes an aperture 55, in the plate 11, through which the bearing extends. On its lower extremity a section of the shaft 54 is of reduced diameter and terminates in an extension 58 which is provided with opposed lateral flat surfaces 59 (Fig. 5) thereon. A shoulder 61 (Fig. 3) is thus provided against which a rotary cam 62 is clamped by means of a screw 63 and washer 64, an aperture 66 (Fig. 6) in the cam 62 includes flat surfaces 67 adapted to register with the flats 59 on the extensions 58. The pulley 28 is thereby rigidly coupled to the cam 62.

As was previously indicated, the notch 53 is opposite the hub during the operation of playing a record. While in this position, Fig. 2, the plate 36 is swung counterclockwise by a tension spring 68 (Fig. 4) anchored between a pin 69, on the plate 11, and a pin 71, carried by plate 36. The pin and slot connection limits the rotation of the plate 36 by the spring. During the record changing cycle the plate 36 is moved and the rim 47 of the friction wheel held resiliently in engagement with the hub 27.

From the position occupied by the wheel 28 while a record is being played (Fig. 2), at the start of the record changing cycle, the wheel is normally urged counterclockwise. This is effected by moving the cam slightly when the mechanism is tripped. The agent for imparting this urge to the wheel 28 and the medium by which the urge is resisted, and best shown in Fig. 8. Therein it will be noted that the cam 62 is engaged by a cam follower roller 72, pivotally supported at the end of a lever 73. The follower is adapted to swing about a pivot 74 on the chassis plate 11 within the limits defined by a slot 75, circumferentially of said pivot, and a headed pin 80 in engagement with the slot, the pin being carried by plate 11. The lever 73 carries a pin 76 at its free end, on which the follower 72 is rotatably mounted. A tension spring 77 is anchored between the bracket 32 and pin 76 and holds the follower 72 against the cam. But the axis of the shaft 54, as will be noted by the position of screw 63, is to one side of the spring 77. Therefore, upon release of the cam a clockwise turning movement is imparted to it.

To hold the cam 62, and consequently maintain the wheel 28 in its playing position (Fig. 2), a latch mechanism is provided. The latch mechanism provides for release of the cam 62 so that driving engagement thereof of the wheel 28 with the hub 27 is established when a record changing cycle is started. It includes a latch lever 78 pivotally journalled on a pin 79 secured to the plate 11. The lever 78 carries, at the end thereof (Fig. 9), a downwardly extending lug 81 adapted to be engaged with a pin 82 extending upwardly on cam 62, to hold the cam and its wheel 28 in the position shown in Figs. 2 and 8.

Operation of the latch lever 78 is controlled by trigger means including a trigger lever 83 pivoted to the plate 11 by a pin 84, Figs. 8, 9, 10 and 14. The lever 83 is provided with notches or stop surfaces 86 and 87 adapted to be engaged by a lug 88, bent downwardly from the lever 78. A tension spring 89, anchored to the plate 11, is attached to a finger 91 struck from the lever 78, and tends to rock lever 78 clockwise thus urging the lug 88 into abutment with one of the stop surfaces 86 or 87. The trigger lever is urged in a counterclockwise direction by a spring 94 attached to a downwardly bent end portion 92 on the trigger lever and a finger 93, struck from the lever 78. When the cam 62 is in its position (Fig. 2 and Fig. 8); that is, the position occupied by the cam 62 while a record is in the process of being played, the lug 88 is pressed against notch 87 so that the stop portion 81 on the lever 78 is in engagement with pin 82 on the cam and arrests rotation of the cam 62. Whenever the trigger lever 83 is rotated clockwise enough to carry the stop 87 out of engagement with the lug 88, spring 89 swings lever 78 clockwise until its rotation is limited by the lug 88 abuting stop surface 86 (Fig. 10) at which point the stop portion 81 is moved from engagement with pin 82 so that the cam 62 is enabled to be turned clockwise, and driving engagement established between the pulley 28 and the hub 27.

Figures 8, 9:
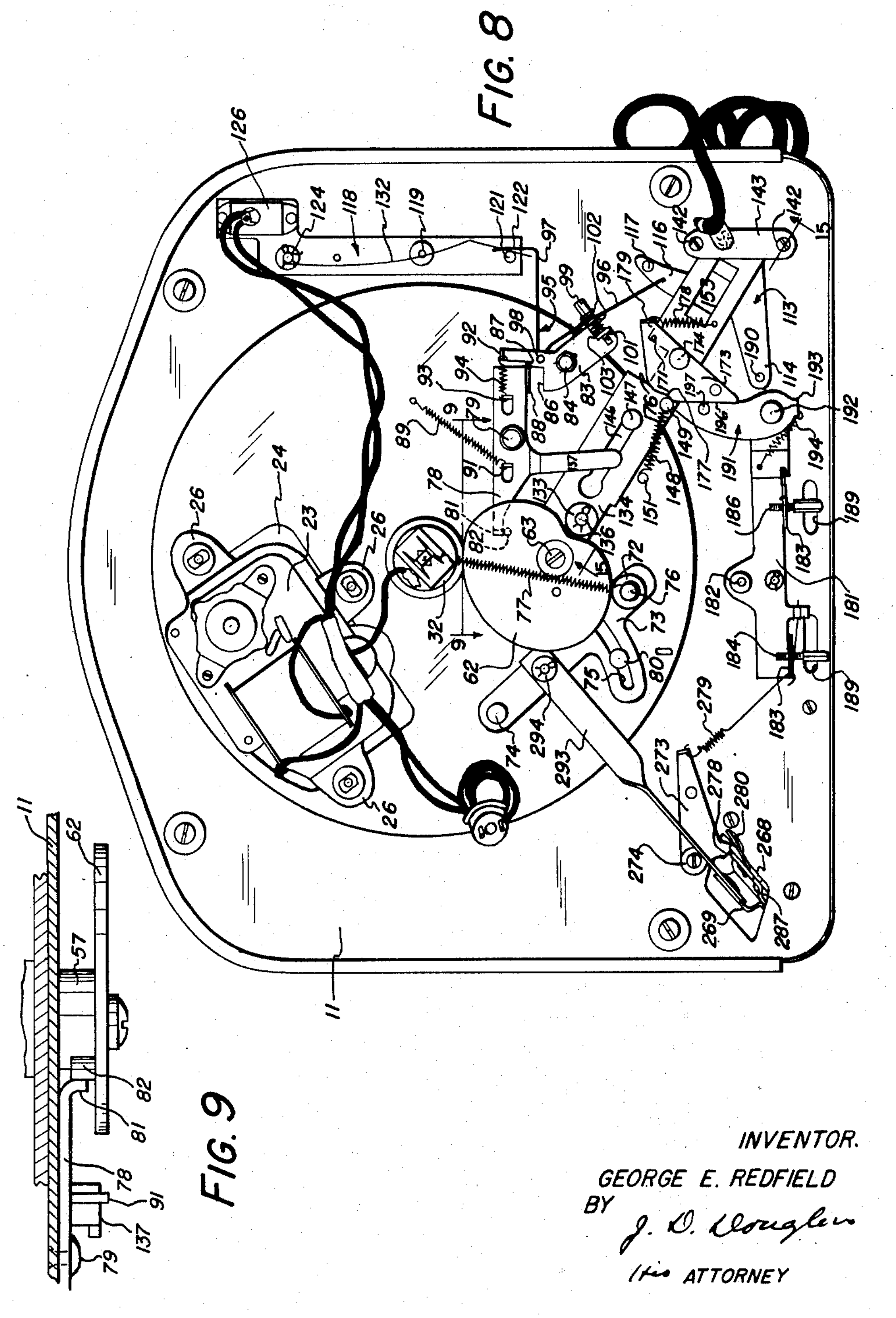
Fig. 8 is a bottom plan view of the record player showing the mechanism on the under side of the chassis or base plate.
Fig. 9 is a section on line 9—9 of Fig. 8 showing the cam trip.

The trigger lever 83 is adapted to be rocked from its Fig. 8 position about its pivot 84 automatically at the end of the playing of a record and manually should it be desired to reject a record. The timing of the release of the trigger lever is adjustable. This is effected by means of a member 95 comprising arms 96 and 97. This member may be of stiff wire and is attached to the arm 83 by a rivet 98 about which the wire is twisted. The arm 96 of the member is also twisted so as to also embrace an adjustment screw 99 which is threaded in a downwardly bent lug 101 on the trigger arm 83. The arm 96 is held between two washers 102 by the force of a compression spring 103 coiled about the screw 99 between the lug 101 and the washers. A secondary function of the spring 103 is to resist change in the adjustment of the screw 99.

Provision is made for automatically rejecting a record. When the pickup arm reaches the end of the sound groove of a record and enters the run out groove. The mechanism for carrying this into effect includes a sleeve 104 rotatably journaled in the pedestal 17 carried on the plate 11. The sleeve 104 bears a hub 107 to which said sleeve is rigidly fastened and to which the pickup arm 16 is also indirectly pivoted by means to be described hereinafter. The pedestal 17 includes a neck 112 extending slightly below the lower surface of the chassis plate 11. Against the neck 112 abuts an actuating member 113, also rigidly carried by the sleeve 104. The actuating member 113 moves with the pickup arm and (Fig. 10) comprises an arm 114 from one side of which extends a cam arm 116, bearing a downwardly extending pin 117 which is adapted to be carried into engagement with the arm 96 as the pickup arm 16 reaches the run out groove of a record being played. It will be apparent then that the motion of pin 117, when carried counterclockwise, is adapted to swing the trigger lever 83 clockwise and thereby release the stop 88 from the obstruction of stop surface 87 so that the stop portion 81 moves out of the path of the pin 82, thereby providing for the start of a record changing cycle. The adjustment of the screw 99 enables the position of contact between the arm 96 and pin 117 to be accurately determined.

Manual ejection of a record may be effected at any point or time during the process of playing a record. Included in the means for carrying out this into operation is a manual reject lever 118 (Figs. 8, 10, and 13) pivoted to the plate 11 by a pin 119. The lever 118 carries, at one end thereof, a downwardly extending pin 121, while the arm 97 is bent laterally to provide a section at 122 adapted to be engaged by the pin 121 as the lever 118 is rocked clockwise (Fig. 13) to thus release the lug 88 (Fig. 10), from engagement by the stop surface 87, resulting in release of the cam 62 and initiation of a record changing cycle. The lever 118 is swingable within limits provided by a slot 123 (Fig. 13) transversely thereof, and a pin 124 passing therethrough, the pin being carried by the chassis plate 11.

The lever 118 also carries toward one end thereof an electric switch 126 to govern operation of the motive unit 23. Although the details of construction of the switch will not be disclosed, since it forms no part of the present invention, it is noteworthy that said switch is opened and closed by sliding a handle 127 (Fig. 1) in a direction longitudinally of the lever 118. To provide for this, the chassis plate 11 includes an aperture 128 of L-shape conformation. The aperture 128 includes an arm 129 so that a section 131, of the switch handle, which is of reduced cross-section, is adapted to be moved laterally with the object of thereby swinging the lever 118 about its pivot 119. Owing to the fact that the section 131 is movable in a direction away from the pivot 119 to open the switch 126, and consequently in a laterally confining portion of the aperture 128, the lever 118 is substantially laterally immovable when the motive device 23 is stationary. The section 131 is normally maintained at the right of the aperture 128 (Fig. 13) by a spring 132, anchored to the pin 124 and engaging the pivot pin 119 to exert pressure against the pin 121.

Cocking or reset means is provided for returning the lever 78 to the position in which the stop portion 81 is adapted to be engaged by pin 82 on the cam 62. This means includes cam follower 133 carried on a slider 134 by a pin 136, extending downwardly from the slider. As the cam 62 rotates from the position it occupies, in Fig. 10 it pushes against follower 133 which is carried through a course, to be described hereinafter, by the slider 134. The lever 78 has a lateral arm 137 which extends into the course that the follower 133 is adapted to be carried through. On engagement with the arm 137, the follower 133 swings lever 78 counterclockwise about its pivot 79 against the resistance of the spring 89. The lug 88 is carried counterclockwise past the stop surface 87, and the spring 94 swings the lever 83 counterclockwise so that after the follower releases the arm 137, the spring 89 is enabled to swing the lug into abutment with the stop surface 87. At this time the stop portion 81 is in position to arrest rotation of cam 62 when the pin 82 is carried into engagement with said stop portion.

The pickup arm 16 is manipulated by means connected to the cam 62. Said means includes a slider 134, slidably anchored to the chassis plate 11 so that it is adapted to be reciprocated under the sleeve 104. To provide for this a pair of bushings 138 (Fig. 15) are mounted on the chassis plate 11 immediately below the pedestal 17. The bushings 138 have end sections 139 of reduced diameter so that a shoulder 141 is thereby provided on each. In order that the bushings 138 may be attached to the chassis plate 11, said plate is clamped between the pedestal and the bushings by screws 142 which pass axially of the bushings, through plate 11 and are threaded into the pedestal 17. The end sections 139 are of slightly greater length than the thickness of the slider so that a bridge 143 clamped under the heads of screws 142 and washers 140 provide therebetween and the shoulders 141 means for confining the slider against vertical displacement. The end sections 139 being in intimate association with the edges of the slider, confine said slider against lateral displacement. Additionally, the slider 134 is provided with a longitudinally-extending slot 146 (Fig. 8) in which is received a headed stud 147 which is carried by the chassis plate 11.

Normally, the slider with its follower 133 is urged toward the cam 62 by a spring 148 which is anchored between a pin 149, on the slider 134, and a pin 151, on the plate 11. The movement of the slider and its follower 133 toward cam 62 is limited by engagement of the stud 147 with one end of slot 146. In this extreme position the follower 133 is in slightly spaced relationship to the cam 62, when the pin 82 is pressed against the lug 81 through the agency of spring 77. Immediately on release of pin 82 as the stop 81 is removed by a reject operation, the cam 62 rotates by the spring 77, clockwise, until the tire 47 of wheel 28 becomes drivingly engaged by the hub 27 of the turntable. The slider is moved longitudinally of its supports beneath the tone arm support, including the sleeve 104 as the cam 62 is rotated. The spring 148 holds the slider and its follower against the cam and returns the slider in a reverse direction.

Figure 11:
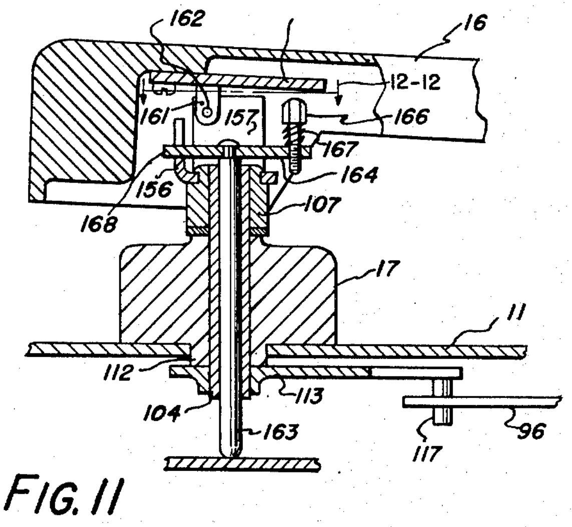
Fig. 11 is a section of the tone arm and its support taken on the line 11—11 of Fig. 10.
Figure 12:
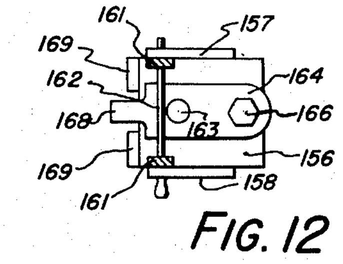
Fig. 12 is a sectional plan view taken on line indicated by 12—12 on Fig. 11.

The pickup arm 16 acquires its vertical motion from a longitudinal movement of the slider 134. This can best be understood by reference to Figs. 11 and 15. Therein it will be noted that the slider 134 includes an upwardly struck cam portion 153 spaced from the main body of the slider, to which it is substantially parallel and connected to the body by sloping end portions 154. The part 153 engages and raises the lift rod 163 for the pickup arm. The support for the pickup arm 16, Figs. 11 and 12, on the other hand, includes a bifurcated member 156 rigidly attached to the hub 107. The member 156 includes lateral arms 157 and 158, extending upwardly while a bracket 159, rigidly carried by the pickup arm 16, bears a pair of ears 161 extending downwardly. The ears 161 are adapted to be in intimate association with the arms 157 and 158 so that by means of a rod 162, passing through the ears 161 and arms 157 and 158, the pickup arm 16 is adapted to be rocked vertically. For conveying rocking motion to the arm 16, the sleeve 104 slidably supports, axially thereof, the lift rod 163. While the lower end of the rod 163 bears against the slider 134 the upper end thereof bears an arm 164 which in turn carries a set screw 166 adapted to engage the bracket 159. If desired, a spring 167 may be coiled about the screw 166 between the head thereof and the arm 164, to resist a tendency of the screw to lose its adjustment. A second end 168 of the arm 164, extends between a pair of fingers 169 with which said arm is intimately associated, so that as the pickup arm 16 is swung about the axis of the rod 163, the fingers 169 swing the arm 164 in order that the screw 166 may cooperate with the bracket 159. It will thus be apparent that while the slide 134 remains in its position indicated in Figs. 8 and 15 that the pickup arm 16 is adapted to engage the sound groove of a record. When, however, the record is rejected and the cam 62 begins to rotate, it pushes the inclined cam portion 156 under the lift rod 163 which rocks the pickup arm upwardly by swinging said arm about rod 162. The lift of the pickup arm may be determined by the adjustment of the screw 166.

The pick up arm 16 starts its lateral motion outwardly; that is, away from the center of a record, after it has been raised and as the horizontal cam portion 156 is moved under the lift rod 163. In order that this may be effected it follows that the actuating member 113 (Fig. 8) must be rotated clockwise. A pin or follower 171 is therefore provided, carried with the slider 134 and positioned in such a way that it is adapted to engage a curvilinear cam surface 172, best shown in Figs. 10 and 14, on the arm 116. Preferably, the pin 171 is yieldably supported from the slider 134 by a safety arm 173 (Fig. 8) from which it extends upwardly and with which it is swingable about a pivot 174 on the slider. The slider is further notched at 176 to accommodate the motion of the pin 171, for reasons later to be described. Additionally, the formation of the safety arm 173 is of such a nature that it includes a stop surface 177 adapted to abut the pin 149. Normally, the stop surface 177 is held in abutment with the pin 149 by a tension spring 178 anchored between the slider 134 and a downwardly extending lug 179 at one end of the safety arm 173. Due to this construction, if the tone arm 16 is grasped and its motion arbitrarily interrupted during a rejecting cycle or when the pin 171 is engaged with the cam surface 172, the spring 178 allows the arm 173 to pivot, and there is no likelihood of fracture or maladjustment of parts as a result.

Figure 14:
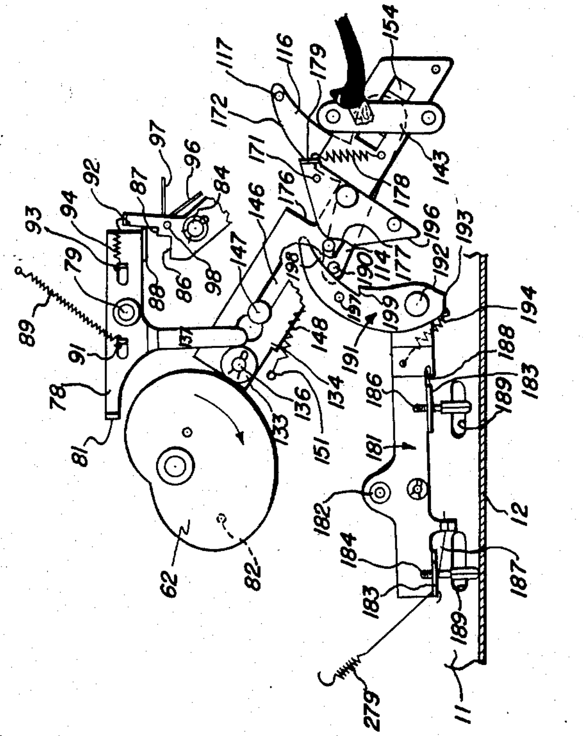
Fig. 14 is a plan view of mechanism shown in Fig. 8, the parts being shown in record rejecting positions.
Figure 10:
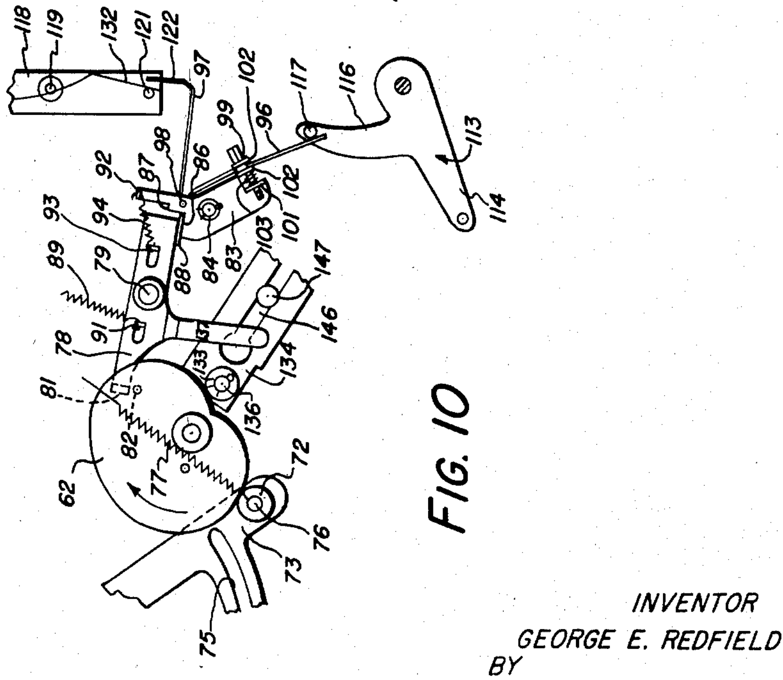
Fig. 10 is a fragmentary plan view of mechanism shown in Fig. 9 showing the trip as actuated and the mechanism at the start of a record changing cycle.
Figures 16, 17, 18:
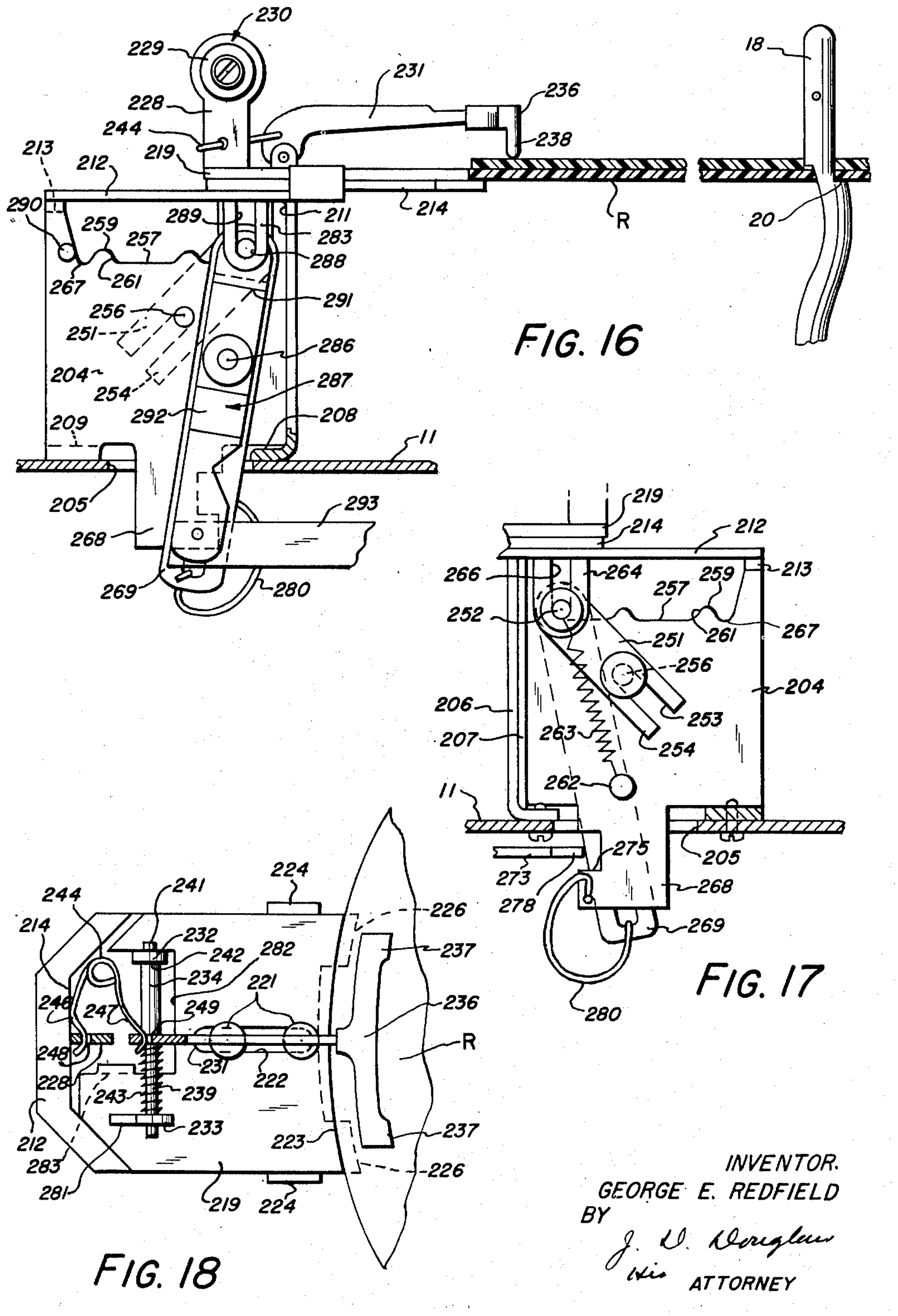
Fig. 16 is a view of the ejector head in elevation, the same being adjusted for playing a stack of 10-inch records.
Fig. 17 is an elevational view of the ejector head showing certain of the parts in the position indicated in Fig. 16, and as viewed from the opposite side of the ejector head.
Fig. 18 is a top plan view of the ejector head, parts being broken away to reveal structural details.

While the foregoing mechanism provides for swinging the tone arm upwardly and to an extreme outward position above a region beside the turntable, other mechanism is employed to swing the tone arm inwardly until it is above the beginning of the sound groove of a record, after which it is lowered into engagement with the record. In other words, special mechanism is provided to determine the "let-down" of the tone arm, be it for a 10-inch or a 12-inch record. The mechanism for the let down is best shown in Fig. 14 and involves the use of a let-down lever 181 adapted to be swung about a pivot 182 on the chassis plate 11. From the lever 181 on either side of the pivot 182 ears 183 extend downwardly. One of the ears 183 bears, threaded therein, a screw 184, while the remaining ear has a similar screw 186 threaded therein. If desired, a section of resilient wire 187 may be bent to embrace the threaded portion of screw 184 and to be suitably anchored to the lever 181 to resist forces tending to alter the adjustment of the screw. The remaining screw 186 may be correspondingly embraced by a section of wire 188. As a means for varying the adjustment of the screws 186 and 184, the plate 11 is provided with elongated apertures 189 above the screws and through which a wrench may be inserted to engage the heads of the screws. The lever 181 carries, at one end thereof, an arcuate cam arm 191 adapted to swing about a pivot 192 on the let-down lever 181. The arm 191 includes an upwardly extending lug 193; a tension spring 194 is anchored between the lug and the lever 181 to normally bias the arm 191 clockwise about the pivot 192. The arm 191 is adapted to engage a pin 190 on the actuating member 113 but is normally, during the playing of a record, held out of engagement with said pin by abutment of an inclined side 196, of the safety lever 173 with a pin 197 extending downwardly from the arm 191, Fig. 8.

As previously stated, the member 113 rotates with the tone arm 16 and consequently moves counterclockwise (Fig. 8) during reproduction of a record. Also, it follows that since the pin 171 engages the cam surface 172 of the actuating member 113, that said member is thus rotated clockwise during movement of the slider toward its extreme outward position (Fig. 14). During this operation, the safety lever 173 is disengaged from the pin 197 thereby allowing arm 191 to be swung by spring 194, into engagement with pin 190. The pressure of pin 171 bearing against arm 116, therefore, rotates the actuating member 113 clockwise until the slider 134 reaches the end of its stroke while at the same time, the pin 190 slides along the curved surface of the arm 191. As the cam 62 continues its rotation from the Fig. 14 position, enabling spring 148 to draw the slider 134 backward, toward its Fig. 8 position, a cam surface 198 on arm 191 is pressed against pin 190 by spring 194 to swing the actuating member 113 counterclockwise until the pin 190 encounters a stop surface or holding notch 199 which interrupts further counterclockwise rotation of the actuating member and pickup arm.

During this interruption, the pin 171 is carried away from arm 116. Then the safety arm 173, being carried into engagement with the pin 197, swings arm 191 from engagement with pin 190 as the lift rod 163 rides down the slope 154 (Fig. 14), thereby lowering the pickup arm into initial position with the sound groove of a record. The position of the notch 199 at the time when it is disengaged from the pin 190 governs the point at which the pickup is lowered into initial operative position relative to the sound groove of a record. The position of notch 199 being variable, since it is capacitated to be swung about the pivot 182, the let-down of the pickup is also variable. Means, to be described hereinafter, is therefore provided for manually shifting the position of the lever 181.

The screws 184 and 186 are adapted to engage the casing 12, severally, to limit rotation of the lever 181. Normally, and particularly during an actual playing operation, the screw 184 engages casing 12 due to the pressure exerted by the safety lever 173 against the pin 197. This is the position of the lever 181 when the machine is in adjustment for manipulating 12-inch records. When, however, it is desired to adjust the machine for 10-inch records, the lever 181 is rocked about pivot 182, by mechanism, later to be described, until the head of screw 186 contacts the casing 12.

Provision is also made for manually controlling the pickup arm as when playing odd sized records. The record player is so capacitated by moving the follower 72 (Fig. 8) out of engagement with the cam 62, that the force of the spring 77, to turn cam 62 from playing position (Fig. 8) is rendered ineffective. The cam 62 then does not swing the wheel 28 into driving engagement with the hub 27. Means by which the follower 72 is removed from engagement with cam 62 will be described hereinafter.

The mechanism of the ejector head 19, without the cover therefore, is best shown in Figs. 16 to 20 inclusive. It comprises vertical support formed by joining support plates 204 and 206. The plate 204 is of L-shaped transverse cross-section which includes a flange 207 adapted to be rigidly held in abutment with the plate 206 in any convenient manner such as by spot welding, so that the vertical support is thereby rigid against forces tending to bend it laterally. The plate 206 includes at the base thereof, an inwardly extending flange or foot 208 by which, along with a foot 209 extending laterally from the plate 204, the vertical support is adapted to be bolted to the chassis plate 11. Upwardly thereof, the plate 206 is further bent transversely thereof at 211 to provide a horizontal guide plate 212, Fig. 20, which is additionally fastened, at the rear end thereof, to a flange 213 on the upper end of plate 204. A shiftable plate 214 is slidably and intimately associated with the top surface of the guide plate 212. It has shouldered rivets 216 which are movable lengthwise in elongated slots 217 extending longitudinally in and near the edges of plate 212. On top of plate 214 is an ejector plate 219 which is slidably mounted on the plate 214. The plate 214 carries a pair of shouldered rivets 221 which extend through a slot 222 that extends longitudinally and centrally of plate 219. The plate 219 is provided with an arcuate edge 223 adapted to approximate the curved periphery of a phonograph record with which the push plate 219 is adapted to engage. The plates 214 and 219 are additionally confined against lateral displacement by a pair of ears 224 extending upwardly from the sides of plate 212 and bent over so as to embrace the two side edges of plates 214 and 219. The plate 214 includes, at one end thereof, a pair of fingers 226 which normally extend from under the push plate 219, a substantial distance, and on which records R of a stack thereof are adapted to rest. The plates 214 and 219 are manually movable together, relative to the support plate 212, by manual means so that the fingers 226 are adapted to support records of either 10-inch or 12-inch size. The manual means includes an arm 228 extending upwardly from the plate 214. Upwardly thereof, the arm 228 is provided with laterally extending knobs 229 bolted to said arm to collectively provide a handle 230.

A hold-down device is provided to urge the records R downwardly against the fingers 226. The device is adapted to exert resilient pressure on the records and this is occasioned by the following mechanism: A hold-down lever 231 is pivoted to a pair of ears 232 and 233, struck from the plate 214, by a shaft 234. Additionally, the lever 231 is provided with a bifurcated extension 236 which includes arms 237 extending outwardly and then in downward portions 238, adapted to press against the top record of the stack R. The arm 231 is rigidly mounted on the shaft 234 from one side of which the shaft includes a section 239, of reduced diameter, journaled in the ear 233. The opposite end of shaft 234 includes a section 241 of reduced diameter journaled in the ear 232. A shoulder 242 occasioned by the section 241 is pressed against the ear 232 by a compression spring 243 coiled about the section 239 and confined between the lever 231 and ear 233. Another spring 244 may be preloaded since arms thereof 246 and 247 are deflected toward each other, one of the arms being engaged by a hole 248, in the arm 228, and the other by a hole 249 in the lever 231. In the full line position (Fig. 19) the spring 244 imparts clockwise rotative urge to the lever 231 for engagement with the records R. When, however, the lever 231 is moved forcibly counterclockwise sufficiently for the end of spring arm 247 to pass beyond an over-the-center position the spring is adapted to hold the lever 231 up against the handle 228, as indicated by broken lines.

Means by which the ejector head is put in readiness to accommodate different sized records is provided. It involves mechanism by which the plates 214 and 219 are releasably stationed in predetermined positions wherein they are adapted to operatively support 10-inch and/or 12-inch records. Mechanism provided for this includes a toggle link 251 (Fig. 17) disposed on one side of the plate 204 and which carries toward one end thereof and extending therethrough a pin 252, Fig. 17. The opposite end of link 251 has a slot 253, extending a substantial distance, provides arms 254 adapted to slidably embrace a headed pin 256 secured in the plate 204.

The upper portion of plate 204 is cut away to provide a generally horizontal portion 257, spaced from plate 212, which at one end terminates in at an upwardly extending stop surface 258. The remaining end of the portion 257 is terminated by an ear 259 which provides a cam surface or stop surface 261 thereat. The pin 256 is below, and disposed substantially midway of the stop surfaces 258 and 261, as is also a stud 262 located, but at a level substantially below the pin 256. A tension spring 263, anchored between stud 262 and pin 252 is therefore adapted to urge said pin against either stop surface 258 or stop surface 261. The record support plate 214 has a downwardly extending lug 264 which is provided with a slot 258 in which is received the pin 252, in vertical slidable relationship therewith, thereby providing for swinging of said pin about pin 256 as the plates 214 and 219 are shifted longitudinally of the guide plate 212, Fig. 17.

Provision is made for taking the plate 214 out of record supporting position; that is, moving the plate 214 in a direction away from the spindle 18 so that the fingers 226 are unable to support the edge of a record when the center hole thereof is engaged by the spindle. The plate 214 is adapted to be so removed when it is desired to manually feed records of the turntable 14. Therefore, a notch 267 is provided beside the ear 259. On grasping the handle 227 and thereby forcing the pin 252 over the ear 259 against the force of spring 263, said spring then holds the pin in engagement with notch 267, and simultaneously follower 133 is (Fig. 8) disengaged from cam 62, through the agency of mechanism to be described hereinafter.

Means to establish a relationship between the position of the record support (indexing for 10" and 12" records) is determined by the position of the pin 252 (Fig. 17) and the position of the let-down lever 181 (Fig. 8). As will be noted, the plate 204 has a lug 268 at the base which extends through the aperture 205 in the base. A follower lever 269 disposed on the opposite side of the support 204 from the toggle link 251 has its upper end connecting to the pin 252. Its lower end has a slot 271 (Fig. 19) through which a headed stud 272, carried by the lug 268, is received. The upper end of lever 269 is therefore adapted to move with the toggle link and the plate 214, the slot 271 providing for slidable movement of the lever relative to the pin 272. Also cooperatively associated with the mobile lever 269 is a bell-crank lever 273 which is pivoted to the under side of the chassis plate 11 by a screw 274. More specifically, the plate 11 is clamped between the foot 208, a flanged bushing 276 and a washer 277 by the screw 274, thereby providing space between the lever 273 and chassis plate besides a bearing for lever 273 on the bushing 276. One end 278, of the bell-crank lever 273, may extend into a notch 275 in the lug 268, for engagement with the edge of the lever 269. The opposite end of lever 273 is coupled to the lever 181 by a tension spring 279 (Fig. 8), normally serving to urge the lever 269 counterclockwise about the pin 272, Fig. 8. When the ejector head is in readiness for support of 12-inch records (Fig. 19), the tendency of spring 194 (Fig. 14) to contract is sufficient to overcome the tension of spring 279 and consequently the screw 184 on lever 181 is in abutment with the casing 12. When, however, the plate 214 of the ejector head is adjusted so that it is in readiness for support of a 10-inch record (Fig. 16) the lever 273 is rotated counterclockwise and the consequent increase in the tension of spring 279 becomes great enough to swing lever 181 clockwise until screw 186 is carried into abutment with the casing 12. If desired, an additional spring 280, Fig. 17, may be employed to draw pin 252 against either seat 258 or the seat 261. The spring 280 is suitably attached, at one end thereof, to the member 263 while its other end is hooked over the lower extremity of slot 271. The lever 269 (Fig. 16) supports the member which operates the ejector plate for ejecting 10-inch or 12-inch records and is movable with the toggle lever to the different adjusted positions.

To allow movement of the ejector plate 219, it is provided with a slot 281 (Fig. 18) through which the ear 233 extends. Also the push plate 219 is notched at 282, and adjacent one side of said notch the ear 232 extends upwardly. From the opposite side of notch 282 on the ejector plate, a lug or yoke 283 is bent, Fig. 16, downwardly extending through an aperture 284 (Fig. 20) in the guide plate 212, the aperture being sufficiently large to accommodate movements of the yoke 283 as well as the lug 264. Pivotally supported at 286 (Fig. 16) on the mobile lever 269 is a push plate lever or ejector lever 287. This lever 287 carries at its upper end a laterally extending pin 288 which is received in a vertical slot 289 in the yoke 283. The lever 287 is offset at 291 to provide clearance between pins 252 and 288 respectively. The lever 287 is also offset at 292 to provide space between the lower ends of levers 287 and 269. This is in order that a link 293 may be pivotally connected to the levers 287. The link 293 being pivoted at 294 (Fig. 8) to the lever 78 thus conveys motion of said lever to the push plate 219.

Figure 19:
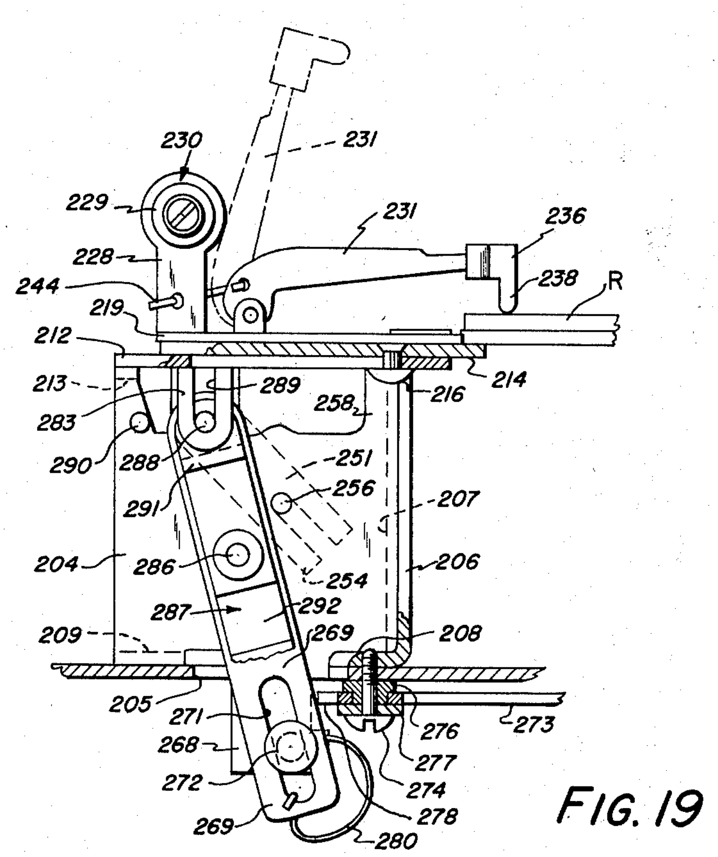
Fig. 19 is an elevational view of the ejector head, the same being viewed as in Fig. 16 with the mechanism adjusted to accommodate a stack of 12-inch records.
Figure 20:
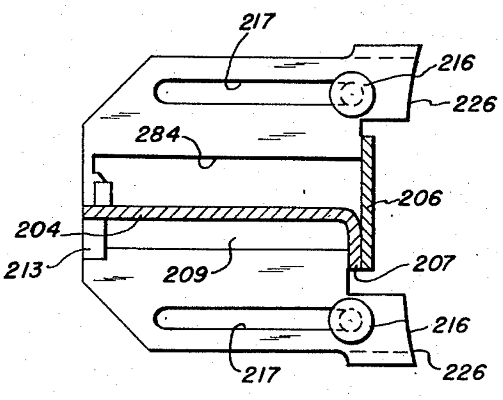
Fig. 20 is a bottom plan view taken on line 20—20 of Fig. 19.

When the pin 252 is moved to the right (Fig. 17), on the left, Fig. 19, past the ear 259, further movement to the right is resisted by contact between lever 287 and a stop 290 carried by plate 204. The stop 290 thus holds the follower 72 in spaced relationship to the cam 62, against the resistance of spring 77.

Operation of the improved record player is as follows: The center holes of each of the records R of a stack are threaded over the spindle 18 so that the bottom record of the stack rests on a shoulder 20 of the spindle while the lowest record of the stack also rests on the fingers 226, being pressed thereagainst by the hold-down arm 231. The turntable is started by moving the switch button 127 away from the observer (Fig. 1). If the cyclically automatic mechanism is in playing position as indicated in Fig. 8, it would, of course, be necessary to move switch button 127 to the left to release the cam 62 and thereby swing the pickup 16 outwardly beyond the downward path of a record which is thereupon dislodged from the fingers 226 by the push plate 219. Then the highest point on cam 62 having passed follower 133, the pick-up arm 16 is swung inwardly to a position governed by the position of pin 190, Fig. 14, and notch 199, said notch in turn being positioned by the handle 230 of the ejector head 19. As previously stated, the pickup arm 16 then having been lowered to operative engagement with the beginning of the sound groove of a record on the turntable 14, is carried inwardly until pin 117 engages (Fig. 10) the arm 96. Consequent movement of the lever 78 releases pin 82 from the stop portion 81 so that the resulting rotation of cam 62 gives rise to disengagement of the pick-up arm from the record being played and outward movement thereof followed by release of another record which is stacked on top of the record just played. This is a cycle of operation and is one which is repeated automatically until the supply of records carried by the ejector head 19 and spindle 18 has been exhausted.

Having thus described my invention in an embodiment thereof, I am aware that numerous and extensive departures may be made therefrom without departing from the spirit or scope of my invention.

I claim:

1. In a phonograph apparatus of the class in which a frame and supported thereby a driven turntable is adapted to receive records from a magazine for records of a plurality of sizes above the level of the turntable and a pickup arm mounted on the frame is adapted to be brought into operative engagement with the beginning of the sound groove of a record regardless of the diameter thereof; means to move said pickup arm comprising, a longitudinally movable slider on said frame, means operatively engaging said slider adapted to move it in a first direction, an actuator member rotatably coupled to the pickup arm, means operably engageable between said slider and said actuator by which said actuator is adapted to be swung in one direction as said slider is moved in said first direction, a let-down lever coupled to said frame at a pivot pin, an abutment member on said let-down lever on either side of said pivoted pin, means providing a stop surface on said frame adapted to be engaged by either of said abutment members, a cam arm pivoted to said let-down lever, means yieldably urging said cam arm into engagement with said actuator, means to move said slider in a second direction, the engagement between said actuator and said cam arm being such as to cause said actuator to be swung thereby in another direction by said cam arm as said slider is swung in said second direction, and release means operable as said slider is moved in said second direction to engage said cam arm to remove it from engagement with said actuator thereby removing the motive force from said actuator.

2. In a phonograph apparatus of the class in which a frame and supported thereby a driven turntable is adapted to receive records from a magazine for records of a plurality of sizes above the level of the turntable and a pickup arm mounted on the frame is adapted to be brought into operative engagement with the beginning of the sound groove of a record regardless of the diameter thereof; means for moving said pickup arm comprising, a longitudinally movable slider disposed on said frame, a cyclically operative drive cam operably engageable with said slider to move it outwardly, an actuator member coupled to the pickup arm, means on said slider engageable between said slider and said actuator adapted to swing said actuator in one direction as said slider is moved outwardly, a let-down lever pivotally coupled to said frame at a pivot point, an abutment member on said let-down lever on either side of said pivot point, means providing a stop surface on said frame adapted to be engaged by either of said abutment members, a cam arm pivoted to said let-down arm; means yieldably urging said cam arm into engagement with said actuator, resilient means engaging said slider to move said slider inwardly, the engagement between said actuator and said cam arm being such as to cause said actuator to be swung in another direction as said slider is swung inwardly, release means operable as said slider is moved inwardly to engage said cam arm to remove it from engagement with said actuator, and means in connection with said slider to rock said pickup arm vertically, said last named means being adapted to lower said pickup arm as said cam arm is disengaged from said actuator.

3. In a phonograph apparatus of the class described including a driven turntable and operatively associated therewith a pickup arm to automatically engage the beginning of the sound groove of a record regardless of the diameter thereof; means for moving said pickup arm comprising, a let-down lever adapted to be manually swung about a fixed pivot, an abutment member on said letdown lever on either side of said pivot, means providing a stop surface adjacent said let-down lever, a control member in pivotal association with said let-down lever, means connected to said let-down lever to swing it about its pivot point, said last named means providing for releasable engagement of one of said abutment members with said stop surface to provide for a plurality of positions of said control member, a longitudinally movable member, means engaging said longitudinally movable member adapted to move it outwardly and then inwardly when a record is rejected, said pickup arm being adapted to be tilted upwardly and downwardly in response to the responsive movements of said longitudinally movable member, an actuator member coupled to the pickup arm, mechanism in connection with said longitudinally movable member to swing the pickup arm outwardly by communicating swinging motion in one direction to said actuator member, and biasing means by which said control member is adapted to be urged into contact with said actuator member to reduce freedom of motion thereof, said control member through its contact with said actuator member and under the influence of said biasing means being adapted to also rotate the pickup arm inwardly as said longitudinally movable member is moved inwardly, said control member being formed to determine the inner limit of movement of said actuator and therefore of said pickup arm, said mechanism being adapted to remove said control member from operative communication with said actuator as downward tilting of said pickup arm is provided for by inward movement of said longitudinally movable member.

4. In a phonograph apparatus of the class in which a frame and supported thereby a driven turntable is adapted to receive records from a magazine for records of a plurality of sizes above the level of the turntable and a pickup arm mounted on the frame is adapted to be brought into operative engagement with the beginning of the sound groove of a record regardless of the diameter thereof; means for moving said pickup arm comprising, a let-down lever pivotally coupled to said frame at a pivot point thereon, an abutment member on said let-down lever on either side of said pivot point, means providing a stop surface adjacent said let-down lever, a control lever pivoted to said let-down lever, means connected to said let down lever adapted to swing it about its pivoted point, said last named means also providing for releasable engagement of one of said abutment members with said stop surface to provide for first and second positions of said control lever, a longitudinally movable slider disposed on said frame, driven means operably engageable with said slider adapted to reciprocate said slider, means including a cam on said slider by which said pickup arm is adapted to be disengaged from a record during initial motion of the slider, an actuator member coupled to the pickup arm, mechanism carried by said slider to swing the actuator in one direction during the first half of a cycle of motion of said slider and means to bias said control lever about its pivot point, said control lever being thereby pressed into contact with said actuator for yieldably resisting swinging of said actuator, said last named means by the contact of said control lever with said actuator being adapted to swing said actuator in the opposite direction during the second half of a cycle of said slider, said mechanism being adapted to engage said control lever to release it from operative communication with said actuator as said cam provides for let down of said pickup arm during the remaining half of the cycle of said slider.

5. In a phonograph apparatus of the class in which a frame and supported thereby a driven turntable is adapted to receive records from a magazine, including an ejector mechanism and shouldered spindle, for records of a plurality of sizes above the level of the turntable and a pickup arm mounted on the frame is adapted to be brought into operative engagement with the beginning of the sound groove of a record regardless of the diameter thereof; means for moving said pickup arm comprising, a let-down lever pivotally coupled to said frame at a pivot point thereon, an adjustable abutment member on said let-down lever on either side of said pivot point, means providing a stop surface adjacent said let-down lever, a control lever pivoted to said let-down lever, means connected between said let-down lever and ejector mechanism to swing said let-down lever about its pivot point from said ejector mechanism, said last named means being also adapted to releasably anchor one of said abutment members in engagement with said stop surface to provide for first and second positions of said control lever, a longitudinally movable slider disposed on said frame, a cyclically operated cam engaging said slider to move said slider outwardly, spring means operably engaging said slides to move said slider inwardly, means including a cam on said slider by which said pickup arm is adapted to be disengaged from a record during initial motion of the slider, an actuator member coupled to the pickup arm, mechanism carried by said slider adapted to engage the actuator member to swing the actuator in one direction during outward movement of said slider and means to bias said control lever about its pivot point into engagement with said actuator member for yieldably resisting freedom of motion of said actuator, said last named means by the engagement between said actuator member and said control arm being adapted to swing said actuator in the opposite direction during inward movement of said slider, said mechanism having means adapted to release said control lever from operative communication with said actuator as said cam provides for let down of said pickup arm during the inward movement of said slider.

6. An apparatus of the class described including a base, a tone arm swingably supported on the base, a rotatable cam supported on the base, a slide in engagement with said cam and movable thereby, a tone arm support rotatably journalled in the base, a first lever connected to the tone arm and engaged by said slide for swinging the tone arm outward, a tone arm raising member slidably disposed in the support, cam means on said slide for engagement with said raising member to raise and lower the same, a tone arm let-down point determining lever including a member pivoted on the base and carrying a cam lever on its end, said cam lever engageable with the tone arm let-down lever to swing tone arm over the record and having a cam surface for engaging said lever spring biased toward said lever and formed with a stop for engagement with said lever to limit inward swinging of the tone arm, stop means on said pivoted member to determine one position for stopping the let-down lever, a first spring means for holding said member against said stop, a second spring means to overcome the effect of the first spring means and allow said member to move against the second stop for determining a second let-down point for said lever.

7. A control apparatus for controlling the movement of the pickup arm of a phonograph record changer and to determine the let-down point of said pickup arm for ten and twelve inch records in combination with a supporting base, a rotatable cam member supported at said base, a slide slidably connected to the base for engagement with said cam, a pickup arm support rotatably journalled in the base, a lever carried thereby and having a first arm for engagement by said slide for swinging the pick-up arm outward, a pickup arm raising pin slidably disposed in the support and a cam on said slide for raising and lowering the pickup arm, a let-down arm on said lever, and means to control the position of the let-down arm including a control member pivoted on the base and carrying a cam member on its end, said cam member engageable with the let-down arm to swing said pickup arm back over the record and having a cam surface for engaging said let-down arm spring biased toward the let-down arm and formed with a stop for engagement with said let-down arm to limit the inward swing of the pickup arm, a pair of stop means on said control member for determining alternate positions of the let-down lever and a first spring means for holding said control member against said stop and a second spring means adjustable to a position to overcome the effect of the first spring means and allow said member to move against the second stop.

8. A phonograph mechanism including a base, a rotatable cam rotatably mounted on said base, a slide, spring means for holding the slide in engagement with the cam, a tone arm lever operating member resiliently carried by the slide, a tone arm support and a lever carried thereby to swing said tone arm outward when engaged by the tone arm operating lever on the slide, a tone arm raising member slidably disposed in the support engageable with the tone arm, a cam on said slide for raising and lowering said member, a second lever carried by said tone arm support, a tone arm let-down lever for determining the let-down point for records of different sizes comprising a cam lever engageable with said second tone arm lever to swing said tone arm back over the record having a cam surface for engaging with the second lever and biased toward said second lever and formed with a stop for engagement with the second lever to limit the inward swinging movement of the tone arm, and a member pivoted on the base carrying said cam lever on its end, spring means for connecting the cam lever to said member, a pair of adjustable stop means on said pivoted member to determine its position, a first spring means for holding said member against one of said stops, a second spring means movable to overcome the effect of the first spring means and allow said member to move against the second stop.

9. A mechanism of the class described including a base, a tone arm mounted on said base driving means including a rotating member journalled in said base, changer operating means including a driven member comprising a friction wheel disposed above the base and formed with a gap in its periphery, a shaft for the driven member, and a cam carried by the shaft below the base, stop means on said cam, a swingable support for said driven member movable toward and away from the driving means, spring means connected to said support biasing said driven member toward said driving means, means to rotate the cam and its friction wheel into driven engagement with the driving means including spring means connected to said cam, means to hold said wheel against rotation with the gap opposite to said driving means including a trip lever pivoted on said base, means for biasing said trip lever to a non-holding position, a cocking arm on the trip lever engageable with said stop means on the cam, a trigger lever for engagement with said trip lever to hold the trip lever in cam stopping position, means to operate trigger lever comprising an arm having a manually operated lever for moving said arm, a second arm, and a lever movable with the tone arm to engage said second arm, adjustable means to adjust the position of the second arm relative to said tone arm lever, spring means connected between said trip and trigger levers to hold them in engagement with each other, cocking means for the trip lever comprising a slide operated by the cam and means on the slide including a cam engaging roller for engaging said cocking arm on the trip lever.

10. In an automatic record changer comprising a frame, a driven turntable rotatably mounted in said frame, in combination, cam means rotatably journalled in said frame and adapted to be driven intermittently by said turntable, said cam means having a single peripheral cam surface, latch means pivotally mounted on said frame adapted normally to engage said cam to hold it in a position disengaged from said turntable, a pickup arm mounted on said frame, actuating means coupled to said pickup arm, slide means slidably disposed in said frame adapted to engage said actuating means to manipulate said pickup arm, follower means on said slide means in driven engagement with said cam surface, an ejector head mounted on said frame, an operating linkage for said ejector head operably connected thereto, follower means on said operating linkage in driven engagement with said cam surface, resilient means engaging said cam means to urge it against said latch means, trigger means engaging said latch means adapted to trip said latch to release said cam means, said trigger mechanism being operated by said actuating means when said pickup arm moves past a certain position.

11. In a record changer having a base, a tone arm mounted in said base adapted to be manipulated both vertically and horizontally, a driven turntable having a hub rotatably mounted on said base and ejector means beside said turntable for dropping records singly onto said turntable; operating means for said tone arm and said ejector comprising, in combination, a wheel formed with a gap in its periphery disposed above said base, said gap being normally adjacent said hub, cam means disposed below said base and fixed to said wheel to be rotated therewith, latch means engaging said cam to hold it in its normal position, said cam being biased in a direction to rotate said wheel into driven relationship with said hub, said latch means adapted to be released when said tone arm reaches the run out groove of a record, slide means slidably disposed on said base in engagement with said cam adapted to manipulate said tone arm, and lever means on said base in engagement with said cam adapted to operate said ejector means sequentially with said tone arm.

12. In phonograph apparatus of the class described including a base, a driven turntable having a hub and rotatably mounted on said base, and a record magazine and a pickup arm mounted on said base; in combination, a friction wheel rotatably mounted on said base adapted to be drivingly engaged with said hub, a rotatable member coupled to said wheel and formed with a single cam surface thereon, said wheel being formed with a break in the periphery, a latch engaging said wheel to hold it with said break normally adjacent said hub, trigger means adapted to engage said latch to release it, spring means engaging said wheel to urge it into driving relationship with said hub when said latch is released, means operated by said cam surface adapted to manipulate said pickup arm, and ejector means engaging said cam surface in spaced relation to said means for operating the pickup arm, said ejector means being operatively connected to said magazine means for ejecting records therefrom.

13. In a phonograph apparatus of the class described including a base, a turntable having a hub rotatably mounted on said base, a record magazine on the base adjacent the turntable and a pickup arm movably mounted on said base; in combination, a friction wheel rotatably mounted on said base adapted to be drivingly engaged with said hub, said wheel being formed with a break in the periphery thereof, a rotatable member rigidly connected to said wheel and formed with a cam surface thereon, means engaging said cam surface and operatively engaging said pickup arm for manipulation thereof, spring loaded follower means engaging said cam at a point such that said rotatable member and said wheel are urged in a direction to cause engagement between said wheel and said hub, latch means engaging said rotatable member to prevent motion in the direction urged by said follower means, trigger means engaging said latch means adapted to release said latch from said rotatable member, means operably engaging said magazine and said cam surface to eject a record from said magazine and means operable from said magazine engaging said follower means and adapted to retract said follower from said cam to allow said rotatable member to remain stationary in spite of release of said latch means.

14. In phonograph apparatus of the class described including a frame, a driven turntable supported on the frame, a hub on said turntable, magazine means mounted on said frame for support of records above said turntable, and a pickup arm movably mounted on said frame; operating means for the phonograph comprising a rotary cam rotatably mounted on said frame, means engaging said cam to operate said pickup arm including swing means for horizontal movement and tilt means for vertical movement, means also engaging said cam adapted to operate said magazine means, a wheel fixed to said cam, said wheel being formed with a break in the peripheral surface, resilient means on the periphery of said wheel from one side of said break to the other, said resilient means being adapted to provide driving engagement between said hub and said cam, said break being normally positioned adjacent said hub, spring means engaging said cam urging it to rotate said wheel into driving relationship with said hub, stop means on said cam and latch means pivoted on said frame normally engaging said stop to hold said cam and wheel in the normal position, means coupled to said pickup arm adapted to engage said latch to release it when said pickup arm reaches a predetermined inward position, thereby allowing said wheel to become driven by said hub to operate said means for operating the pickup arm and magazine means, and preset means engageable between said latch means and said pickup arm operating means to return said latch means to its holding engagement with said stop means.

15. In phonograph apparatus of the class described including a frame, a driven turntable mounted on said frame and having a hub, a record magazine mounted on the frame adapted to discharge records to said turntable, and a pickup arm means adapted to play said records; operating means for said phonograph comprising a cam rotatably mounted on said frame, means engaging said cam adapted to operate said magazine, pickup operating means also engaging said cam including tilt means to operate said pickup arm vertically and swing means to operate said pickup arm horizontally, a friction wheel fixed to said cam, said wheel being formed with a break in the periphery thereof, latch means engaging said cam adapted to hold it and said wheel in a normal position where said break is adjacent said hub of the turntable, spring means engaging said cam urging said cam against said latch means, trigger means engaging said latch adapted to release said latch from said cam, said spring thereupon being adapted to rotate said wheel into driving engagement with said hub, and means operably connected to said pickup arm adapted to engage said trigger means to cause it to release said latch at a predetermined position of said pickup arm.

16. In a phonograph apparatus of the class described including a frame, a driven turntable rotatably mounted on said frame, a record magazine on said frame adapted to discharge records onto said turntable, and a pickup arm movably mounted on said frame; operating means for said phonograph comprising a cam rotatably mounted on said frame, means engaging said cam adapted to operate said record magazine, means also engaging said cam to operate said pickup arm including tilt means for operating said arm vertically and swing means for operating the arm horizontally, a friction wheel rigidly attached to said cam adapted to engage said hub in driven relation thereto, a stop on said cam, a latch movably mounted on said frame adapted to engage said stop, spring means engaging said cam to urge said stop against said latch, said wheel being formed with a notch in its periphery, said wheel being normally positioned by said latch and stop with said notch adjacent said hub, resilient means engaging said latch urging said latch out of engagement with said stop, trigger means engaging said latch to hold it normally in position to be engaged by said stop, manual means on said frame adapted to move said trigger to release said latch thereby allowing said wheel to rotate into driven engagement with said hub, said swing means including means adapted to engage said trigger to release said latch upon said pickup arm reaching a predetermined position, and preset means engageable between said latch and said operating means for said pickup arm to move said latch back to its position to engage said stop.

17. In an automatic record changer comprising a frame, a driven turntable having a hub mounted on said frame, in combination cam means rotatably journalled on said frame and having a friction wheel connected thereto adapted to be moved into intermittent driving engagement with said turntable, said cam means having a single peripheral cam surface, latch means pivotally mounted on said frame and arranged to hold said friction wheel and cam means in a non-driven position, a pickup arm mounted on said frame adjacent said turntable and having actuating means coupled thereto, slide means slidably disposed on said frame arranged to connect with and manipulate said pickup arm, said slide means being in slidable driven engagement with said cam surface, trigger means in holding engagement with said latch means arranged to be engaged by said actuating means and to release said latch means at a predetermined position of said pickup arm, and ejector means mounted on said frame for releasing a record to said turntable, and means connecting said ejector for driven engagement with said cam surface and moved thereby to actuate said ejector means sequentially relative to movement of said tone arm.

18. In a phonograph apparatus of the class described including a frame, a driven turntable rotatably mounted on said frame, a hub on said turntable, a record magazine on said frame adapted to discharge records onto said turntable and a pickup arm movably mounted on said frame; operating means for said phonograph comprising a cam rotatably mounted on said frame, friction means connected to said cam and cyclically engageable with said hub to drive said cam, a latch releasably engaging said cam to hold it in a normal position, trigger means engaging said latch, said latch adapted to be moved to release said cam in response to movement of said trigger means from engagement with said latch, a slider slidably disposed on said frame operably connected to said cam, means operably connecting said slider to the pickup arm adapted to tilt said pickup arm upon movement of the slider by the cam, swing means on said slider connected to the pickup arm adapted to move said pickup arm horizontally, said slider being moved away from the axis of said cam upon rotation of said cam, spring means engaging between said slider and said frame to hold said slider toward said cam, and means on said slider arranged to engage said latch upon movement of said slider to reset said latch in its position to engage and hold said cam after its release by said trigger means.

GEORGE E. REDFIELD.

References Cited in the file of this patent

UNITED STATES PATENTS

| Number | Name | Date |
|---|---|---|
| 1,938,810 | Collison et al. | Dec. 12, 1933 |
| 2,062,396 | Carson | Dec. 1, 1936 |
| 2,309,352 | Offen | Jan. 26, 1943 |
| 2,323,472 | Johnson et al. | July 6, 1943 |
| 2,330,293 | Knox | Sept. 28, 1943 |
| 2,331,383 | Faulkner | Oct. 12, 1943 |
| 2,371,361 | Small | Mar. 13, 1945 |
| 2,376,741 | Weaver | May 22, 1945 |
| 2,390,862 | Alexandersson et al. | Dec. 11, 1945 |
| 2,397,932 | Erwood et al. | Apr. 9, 1946 |
| 2,426,978 | Alexandersson | Sept. 9, 1947 |
| 2,435,264 | Ansar | Feb. 3, 1948 |

FOREIGN PATENTS

| Number | Country | Date |
|---|---|---|
| 67,631 | Norway | Mar. 27, 1944 |
| 235,600 | Switzerland | June 1, 1945 |